United States Patent
McCloy, Jr.

[19]

[11] Patent Number: 6,106,042
[45] Date of Patent: Aug. 22, 2000

[54] DEVICE FOR RETRIEVING ITEMS

[76] Inventor: Alvin D. McCloy, Jr., 400-A Front St., Zelienople, Pa. 16063

[21] Appl. No.: 09/317,461

[22] Filed: May 24, 1999

[51] Int. Cl.$^7$ ....................................................... B66C 1/42
[52] U.S. Cl. ............................ 294/100; 294/1.1; 294/82.1
[58] Field of Search ...................................... 294/1.1, 19.1, 294/19.3, 66.1, 66.2, 82.1, 86.4, 100; 43/42.7, 44.2, 44.4, 44.6, 44.9, 44.97

[56] References Cited

U.S. PATENT DOCUMENTS

| | | | |
|---|---|---|---|
| 626,777 | 6/1899 | Slotterbeck | 43/42.7 |
| 1,051,992 | 2/1913 | Fisher et al. | 294/66.1 |
| 1,271,435 | 7/1918 | Cloutier . | |
| 3,097,373 | 7/1963 | Wisti | 294/66.1 |
| 4,130,314 | 12/1978 | Storm | 294/100 |
| 5,388,877 | 2/1995 | Wenk | 294/1.1 |
| 5,613,721 | 3/1997 | Mullins | 294/1.1 |

*Primary Examiner*—Dean J. Kramer
*Attorney, Agent, or Firm*—George C. Atwell

[57] ABSTRACT

A manually-operable device for use by tree stand hunters for retrieving items that have been left on the ground or that have fallen from the hunter or tree stand onto the ground, includes an elongated shank, a rope having one end attached to the shank and an opposite end for grasping by the hunter situated in the tree stand, a plurality of flexible arms attached to the shank which are movable from an open position to a gripping position and are radially disposed circumjacent the longitudinal axis of the shank, a trigger plate slidably mounted on the arms for selectively spreading the arms and selectively closing the arms so that the item can be retrieved and released, and a weighted disc mounted on the shank for linear, reciprocable movement thereon so that the movement of the disc on the shank causes the disc to contact the trigger plate thereby forcing the trigger plate to slide on the arms, thus drawing the arms toward the shank axis so that the arms engage and retrieve the item.

7 Claims, 2 Drawing Sheets

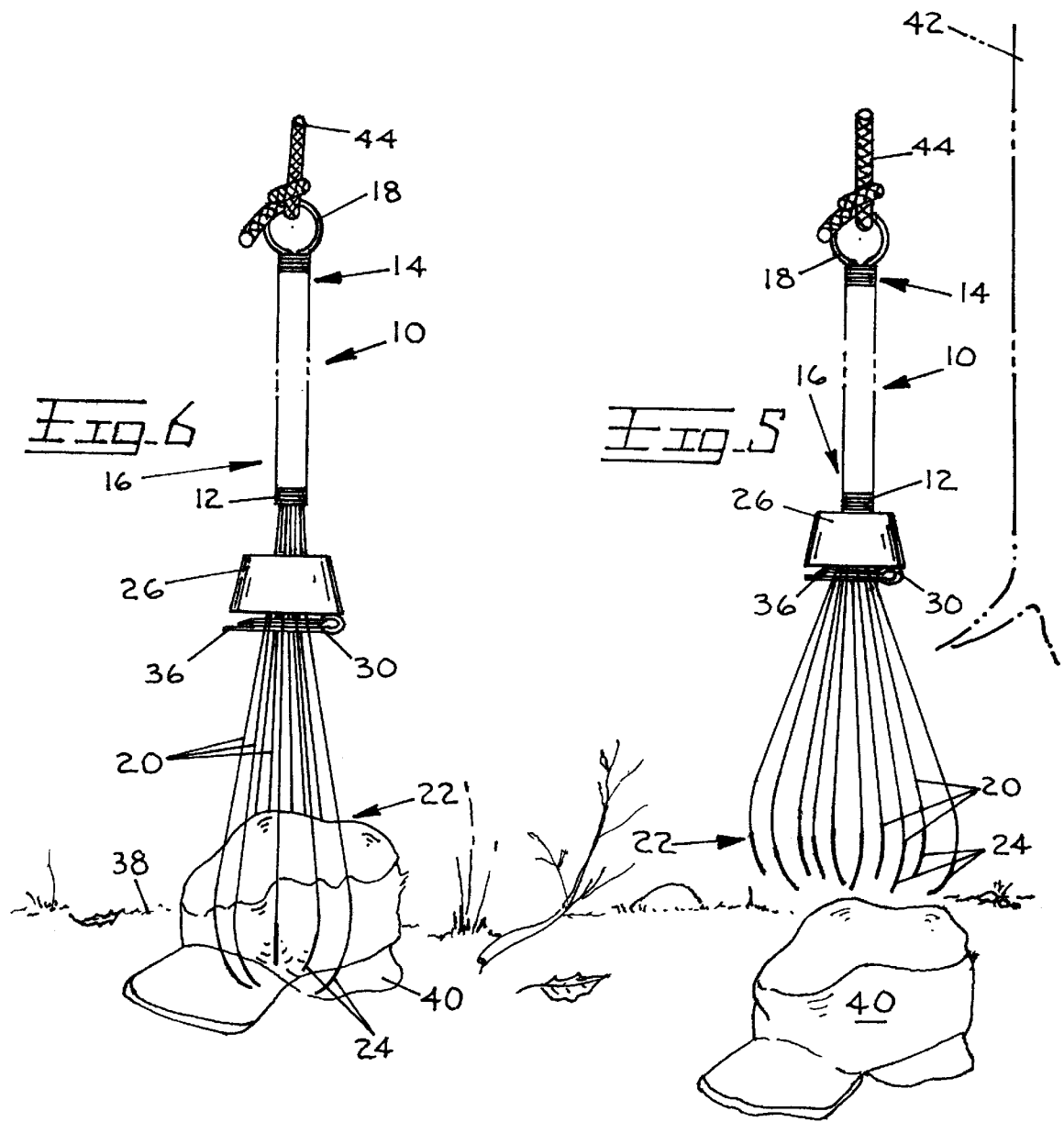

DEVICE FOR RETRIEVING ITEMS

FIELD OF THE INVENTION

The present invention relates to devices for retrieving items and, more particularly, pertains to a manually-operable device usable by a hunter situated in a tree stand for retrieving items that have been left on the ground or that have fallen from the tree stand onto the ground.

Contemporary hunting can take many forms, including: a single hunter walking slowly through a field in order to flush game out of the undergrowth; a party of hunters divided into groups with one party driving the game into a clearing or through an open field and the other party located at an unhindered shooting vantage; or a solitary, camouflaged archery hunter concealed behind shrubbery or trees patiently waiting for the game animal to come into range.

Another popular form of hunting is tree stand hunting. Tree stands come in a variety of designs, but all tree stands are essentially two-piece items that include a metal structure for gripping the tree trunk so that both portions of the tree stand can be locked onto the tree trunk adjacent the base 180 degrees opposite each other. In order to walk the tree stand up the trunk, the hunter, while sitting in the seat portion, must continuously depress and release a peddle or treadle, causing the metal structure to firmly grip the tree trunk so that the tree stand can be slowly walked up the trunk to the desired height. It is a slow and arduous task to walk the tree stand up the tree trunk. Upon reaching the desired height, which may be fifteen or twenty feet above the ground, the hunter locks the two portions of the tree stand to the tree and begins to arrange and prepare his equipment for hunting.

Tree stand seats are small and compact, and the tree stands themselves do not provide an adequate flat surface area or hooks, pegs, handles, shelves or compartments for holding or storing items. The hunter does not want to leave any piece of equipment or any item on the ground adjacent the tree for fear that the unfamiliar item would spook the game or that the human scent exuded, however minute, would provide a warning and scare off the species of game animal being hunted. Thus, should any piece of equipment or item, such as binoculars, grunt calls, arrows, quivers, thermos, hats, gloves, rope, knives, small food and snack packages fall onto the ground, the hunter must unlock the tree stand and slowly and laboriously walk the tree stand down the tree trunk until the hunter reaches the base of the tree trunk, whereupon the hunter unstraps himself from the seat and retrieves the item. Then the hunter must strap himself back into the seat and commence the slow and difficult process of again walking the tree stand up the tree trunk to the appropriate position.

During this entire process of coming down the tree to retrieve the item and then walking the tree stand up the tree, the hunter runs the obvious danger of exposing his position to any game animals in the area and leaving his scent upon the ground. Once the hunter is situated in the tree stand, he does not want to leave the tree stand until he is done hunting because of the labor and time involved in such movement and the high likelihood that such movement, noise, and human scent left behind will spook and frighten off game animals that may otherwise come within the hunter's range.

DESCRIPTION OF THE PRIOR ART

In order to avoid the time and labor involved in walking the tree stand up and down the tree trunk to retrieve items that have inadvertently fallen from the hunter's clothing or from the tree stand, the hunter could possibly devise a makeshift retrieval device consisting of a grappling hook tied to one end of a twenty-foot long rope or perhaps some type of magnet and hook arrangement. U.S. Pat. No. 1,271,435 discloses a device for retrieving clothing items that have fallen from a clothesline. The device includes two elongated members each of which terminates with oppositely-disposed hooks and a weighted ring which can slide along the elongated members.

However, neither the above-described makeshift devices nor the clothes hook of the above-cited patent can retrieve fallen items like pencil-thin arrows, a snuff can or a candy bar. Moreover, the above devices would be awkward and difficult to maneuver on uneven terrain dotted with rocks, fallen trees, decaying logs, and blanketed with a dense undergrowth.

SUMMARY OF THE INVENTION

The present invention comprehends a device for retrieving items and, more particularly, comprehends a device manually operable by a hunter seated in a tree stand for retrieving hunting equipment, items and personal belongings inadvertently left on the ground or that have fallen from the hunter's clothing or tree stand onto the ground adjacent the trunk of the tree supporting the tree stand.

The item retrieval device of the present invention includes an elongated shank which defines a longitudinal axis and has a first end and an opposite second end. Projecting in axial alignment from the first end of the shank is an eye and to which one end of a rope, approximately fifteen to twenty-five feet long, is tied. The other end of the rope is held by the hunter for manipulation of the device during item retrieval. Secured to the second end of the shank are a plurality of elongated, flexible, curvilinear arms, and the arms are radially disposed about the longitudinal axis of the shank. The distal portion of each arm terminates with an integral finger for grasping the item.

The arms are capable of moving between an open or release position and a gripping position in order to grasp and retrieve the item from the ground and then release the item after the hunter has drawn the device holding the retrieved item up to the tree stand. A circular trigger plate is mounted on the arms adjacent the second end of the shank, and the trigger plate includes a plurality of apertures radially spaced about the periphery of the trigger plate so that one respective arm extends through each aperture. This allows the trigger plate to travel in a linearly-reciprocable manner on the arms. A locking rod or pin is attached to the trigger plate transverse to the diameter of the plate, and a portion of the each opposed end of the locking rod extends past the periphery of the plate. Thus, the hunter can grasp the opposed ends of the rod in order to pull the trigger plate toward the second end of the shank thereby causing the arms to radially separate to the open position.

A weighted disc is mounted on the shank and has a central opening which allows the disc to freely travel in a linearly-reciprocable manner on the shank. As the device is dropped on the item, the weighted disc strikes the trigger plate and forces the trigger plate to travel downward on the arms toward the fingers, thereby drawing the arms radially together so that the fingers can grip the item for its retrieval by the hunter.

It is an objective of the present invention to provide a device for retrieving items that have been left on the ground or that have fallen from a hunter's tree stand which is lightweight, easy to operate, and capable of storage in the hunter's hunting jacket or pants pocket.

It is another objective of the present invention to provide a device for retrieving hunting equipment and items that can grasp and hold a wide variety of irregularly-shaped items.

Yet another objective of the present invention is to provide a device for retrieving items which can retrieve hunting equipment and items from rocky, cluttered, uneven terrain.

These and other objects, features, and aspects of the present invention will be better understood from the following detailed description of the preferred embodiment when read in conjunction with the appended drawing figures.

BRIEF DESCRIPTION OF THE DRAWINGS

FIG. 5 is a perspective view illustrating the positioning of the item retrieval device above an item laying on the ground; and FIG. 6 is a perspective view of the item retrieval device gripping and retrieving the item first shown in FIG. 5.

DETAILED DESCRIPTION OF THE PREFERRED EMBODIMENT

Figure 1:
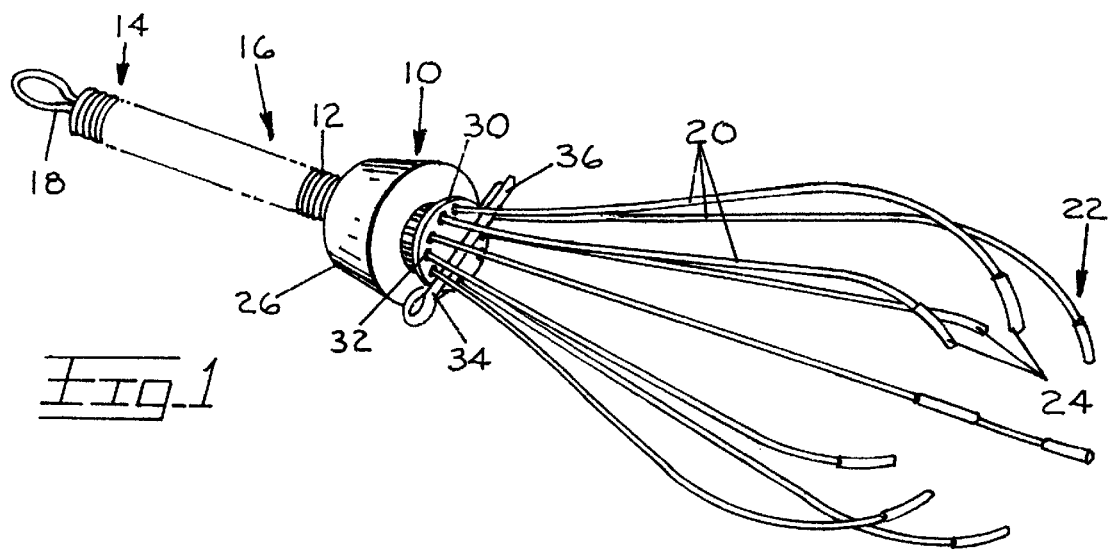
FIG. 1 is a perspective view of the item retrieval device illustrating the device in the release or open position.
Figure 2:
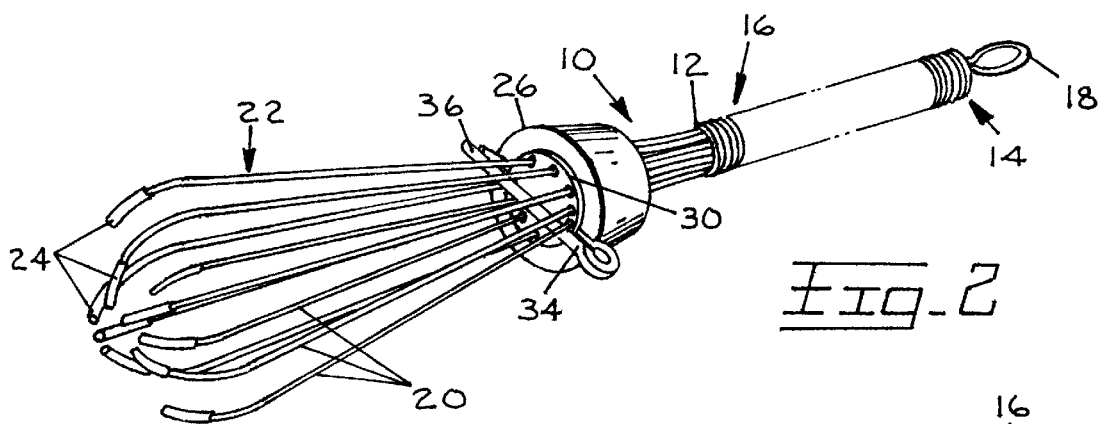
FIG. 2 is a perspective view of the item retrieval device first shown in FIG. 1 illustrating the device in the gripping position.
Figure 4:
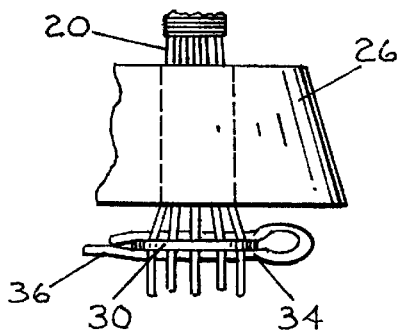
FIG. 4 is a fragmentary elevational view of the disc and trigger plate shown in FIG. 3.
Figure 3:
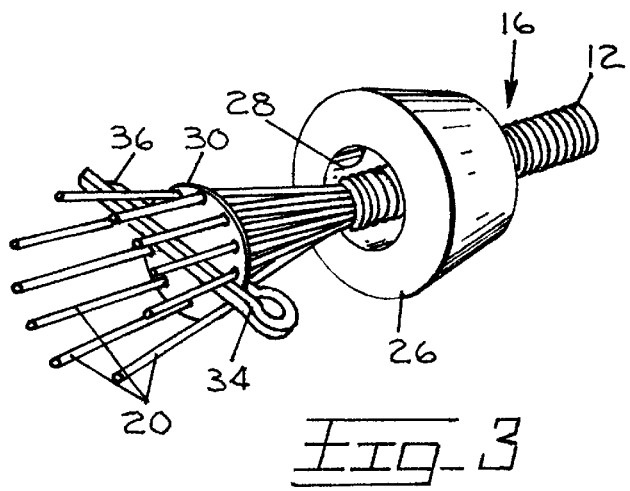
FIG. 3 is an enlarged perspective view illustrating the mounting of the disc and trigger plate on the shank and arms of the device.

Illustrated in FIGS. 1–6 is a manually-operable item retrieval device 10 for grasping or grabbing stationary items at one location or position and drawing and retrieving the items by pulling the device 10 upward to a second location or position at a greater elevation than the original location of the item. Specifically, the item retrieval device 10 is predominantly for use by tree stand hunters to retrieve hunting items and equipment that have either been inadvertently left on the ground by the hunter or which have fallen from the hunter as the tree stand is being walked up the tree trunk to the desired height. In addition, upon reaching the desired height on the tree and having locked the tree stand to the tree trunk, the item retrieval device 10 can then be used to retrieve items that have accidentally fallen from or inadvertently been knocked off the tree stand onto the ground. It is advisable not to use the item retrieval device 10 to pick up archery bows or rifles that are laying on the ground, but other items, such as grunt calls, quivers, arrows, hats, gloves, binoculars, and even a thermos jug can be retrieved. The device 10 is lightweight and sized to easily fit into the pocket of a hunting jacket or the pocket of camo hunting pants.

As shown in FIGS. 1–6, the item retrieval device 10 includes an elongated shaft, handle or shank 12 having a first end 14 and an opposite second end 16. The shank 12 can be solid throughout its length or the shank 12 can include a passageway or bore extending therethrough and coequal in length with the shank 12. The shank 12 is a generally rigid, non-bendable structure and defines an axis which extends longitudinally through the body of the shank 12. The shank 12 can also be manufactured as a solid, cylindrical, elongated object. Attached to the first end 14 of the shank 12 and projecting in axial alignment therewith is an eye or loop 18. As shown in FIGS. 5 and 6, in order to lower the device 10 onto the item and then retrieve the item by pulling the device 10 up to the tree stand, a rope is used which has one end tied to the loop 18 and a second end which is manually graspable by the hunter situated in the tree stand.

Illustrated in FIGS. 1–6 is a grasping and retrieving means which physically engages or contacts the item so that the item can be retrieved. More specifically, the grasping and retrieving means for the present invention includes a plurality of elongated, flexible, curvilinear arms 20 attached to the second end 16 of the shank 12. When the device 10 is disposed in the operative position, as shown in FIGS. 5 and 6, the arms 20 are pendent from the shank 12. The arms 20 can be manufactured from a number of different materials, the preferred material being stainless steel or spring steel, which has the qualities of both flexibility and tensile strength. The arms 20 are attached to the second end 16 of the shank 12 so that they are radially disposed about the imaginary longitudinal axis of the shank 12. The arms 20 are capable of independent movement from each other despite the fact that they are mounted at their respective base portions to the second end 16 of the shank 12. The elongated and flexible nature of the arms 20, combined with structure which will be hereinafter further described, permits the arms 20 to selectively move from a radial and concentric disposition about the longitudinal axis of the shank 12, to a disposition in which the arms 20 are radially contracted or drawn together inwardly toward the longitudinal axis of the shank 12. Each arm 20 terminates at its distal end 22 with a finger 24, and each finger 24 may have a protective covering, such as a rubber jacket or sleeve, to protect items, such as binoculars, from being scratched or marred as they are being retrieved. When the arms 20 are disposed in the non-use or open position, the fingers 22 are spaced from each other and are radially disposed circumjacent the longitudinal axis of the shank 12. When the device 10 is actually in the gripping state for grasping an item whereupon the arms 20 have been radially drawn or contracted together about the axis of the shank 12, at least some of the fingers 24 may overlap or be interleaved with one another concomitant with the contact or engagement of the item by the fingers 22.

As shown in FIGS. 1–6, several structural elements are necessary to move the arms 20 from the open or non-use position to the closed grasping or gripping position in a simple, efficient, and reliable manner that only requires the hunter to set or cock the device 10, position the device 10 over the target item, and lower the device 10 to a position immediately above the item whereupon the device 10 can be dropped onto the item for retrieval thereof. Mounted on the shank 12 is a weighted member 26 which is capable of linear reciprocal movement from the first end 14 of the shank 12 to the second end 16 and then past the second end 16 a short distance along a portion of the arms 20 adjacent the second end 16. It should be noted that the weighted member 26 does not slide upon the shank 12 or the portion of the arms 20 adjacent the second end 16 of the shank 12. As the device 10 is dropped onto the item for retrieval of the item, the weighted member 26 drops freely on the shank 12 and the portion of the arms 20 adjacent the second end 16, thereby initiating a series of mechanical movements that result in the item being gripped by the fingers 24.

As shown in FIGS. 1–6, the weighted member 26 is a frustrum-shaped disc having a central aperture 28 and which is mounted on the shank 12 by inserting the shank 12 through the central aperture 28. The weighted member 26 does not come off the first end 14 of the shank 12 because the diameter of the loop 18 is greater than the diameter of the central aperture 28, thus the loop 18 helps to confine or restrict the movement of the weighted member 26 on the shank 12. If the weighted member 26 is too light, the weighted member 26 will not be able to initiate the action which results in the radial contraction or drawing together of the arms 20 so that the fingers 24 can grasp the item. If the weighted member 26 is too heavy, the weighted member 26 will prematurely initiate the action which causes the fingers 24 to radially draw together for item retrieval as the device 10 begins its descent from the tree stand to a hovering position over the item. This will dispose the fingers 24 to the gripping position before they have even come in contact with the item to be retrieved. The weighted member 26 must have just enough mass so that the weighted member 26 will not cause the arms 20 to radially contract as the hunter is initially lowering the device 10 over the item. In addition, the weighted member 26 must have the appropriate mass to initiate the action which causes the radial contraction of the arms 20 during the last several inches through which the device 10 travels as the device 10 drops onto the item.

In addition to the weighted member 26 shown in FIGS. 1–6, the device 10 includes a trigger means for spreading and temporarily locking the arms 20 in the open or non-use position whereupon the arms 20 are radially spread about the axis of the shank 12, and also for causing the arms 20 to radially contract or draw together around the axis of the shank 12 so that the fingers 24 can grip and retrieve the item. The trigger means operates in conjunction with the weighted member 26 to selectively spread the arms 20 and selectively contract or draw the arms 20 together or toward each other in order to both grasp and then release the item. The trigger means includes a circular trigger plate 30 that includes a plurality of equidistantly-spaced apertures 32 located adjacent the periphery of the trigger plate 30. Each aperture 32 is sized so as to receive therethrough one respective arm 20, and the diameter of each aperture 32 is greater than the outside diameter of the respective arms 20 so that the trigger plate 30 can freely move and slide in a linearly-reciprocable manner upon the arms 20. Mounted to the trigger plate 30 is a locking pin or rod 34, and the locking rod 34 extends across the diameter of the trigger plate 30 so that the opposite ends 36 of the locking rod 34 project past the periphery of the plate 30. This allows the hunter to grasp one end 36 of the locking rod 34 with, for example, his or her index finger and the opposite end 36 of the locking rod 34 with the middle finger to slide the trigger plate 30 on the arms 20 in order to draw the trigger plate 30 toward the second end 16 of the shank 12 until the trigger plate 30 can be pulled or drawn back no further on the arms 20. When the trigger plate 30 reaches the limit of its rearward movement, the trigger plate is now disposed in the locked or locking state. The trigger plate 30 will remain in this state until an oppositely directed force is applied to it, whereupon the plate 30 will be dislodged or unlocked. The locking rod 34 can be a cotter pin welded to the trigger plate 30; but, in any case, the locking rod 34 should not impede the movement or travel of the trigger plate 30 on the arms 20 nor should the locking rod 34 interfere with any of the apertures 32 on the trigger plate 30.

With reference to FIGS. 5 and 6, the use of the device 10 can occur in the following manner. First, the hunter (not shown) will be situated in his or her tree stand (not shown), with the tree stand generally located fifteen to twenty feet above the ground 38. An item, such as a hat 40, will have either fallen onto the ground 38 or been left on the ground 38 and would be located in a position adjacent to the tree trunk 42 and within the radius of the tree stand. Items located beyond the radius of the tree stand, and also beyond the hunter's reach will, obviously, not be retrievable. Upon determining that the item is within reach and generally located adjacent to the base of the tree trunk 42, the hunter will grasp the trigger plate 30 and draw the trigger plate 30 rearward on the arms 20 and toward the second end 16 of the shank 12. The trigger plate 30 will be slid or moved rearward on the arms 20 until the trigger plate 30 is tightly locked on the arms 20 and no further rearward movement of the trigger plate 30 is possible. Simultaneous with the hunter manually drawing the trigger plate 30 rearward on the arms 20, the arms 20 radially separate as a result of the rearward movement of the trigger plate 30. Thus, the greatest radial separation of the arms 20 is achieved at the point when the trigger plate 30 locks and can be forced no further rearward on the arms 20. The fingers 24 would also separate from each other and would be concentrically disposed about the axis of the shank 12. While the trigger plate 30 would be in the locked position, forcibly and tightly wedged at the base portions of the arms 20, the device 10 would now be in the open or non-use state.

The hunter would then grasp one end of the rope 44 and carefully position the device 10 with the arms 20 pointing downward toward the ground 38, and then the hunter would slowly and carefully lower the device 10 over the hat 40. The weighted member 26 would actually rest against the trigger plate 30 and the weighted member 26 would remain resting against the trigger plate 30 as the device 10 is lowered over the hat 40. The device 10 would be lowered down toward the hat 40 until only a distance of several inches separated the hat 40 from the fingers 24, and then the hunter would hold the rope 44 and halt the further downward movement of the device 10 at that point. Taking care to precisely align the device 10 over the hat 40, the hunter would then drop the device 10 onto the hat 40 and thereby retrieve the hat 40. Immediately upon striking the item or ground 38, the weighted member 26 is activated or actuated and travels downward by gravity a slight distance on the arms 20, thereby striking, unlocking, and forcing the trigger plate 30 to also travel downward on the arms 20 toward the fingers 24. The downward movement of the trigger plate 30 toward the fingers 24 will quickly cause the arms 20 to radially contract and draw together thereby also causing the fingers 24 to contact and grip the hat 40. In effect, the swift downward movement of the weighted member 26 will cause the trigger plate 30 to travel a short distance on the arms 20 and simultaneously contract the arms 20 toward the axis of the shank 12. The trigger plate 30 traveling over the short distance causes the arms 20 to draw together toward the axis of the shank 12, enabling the fingers 24 to engage, close upon, and grip the hat 40.

As shown in FIG. 6, the device 10 has now been disposed in the gripping state or position with the hat 40 firmly grasped by the fingers 24 and perhaps a portion of the arms 20, depending upon the size and configuration of the item. The hunter can then pull the rope 44 up, thereby retrieving the hat 40. Because of the spacing and number of the arms 20 and the curvature of the arms 20 adjacent and continuing through each finger 24, the hat 40 is held securely by and between the fingers 24 and will not fall out as the rope 44 is drawn up by the hunter. Upon drawing the device 10 up to the tree stand, the hunter can simply grasp the trigger plate 30 with the fingers of one hand and pull back on the trigger plate 30, thereby causing the arms 20 to radially separate and release the hat 40. The trigger plate 30 can be fully drawn back on the arms until it stops for disposing the device 10 in the locking position so that the device 10 is ready for the next use of retrieving an item.

While a preferred embodiment is herein disclosed, it is to be clearly understood that the invention is not to be limited to the exact constructions, mechanisms, and devices illustrated and described because various modifications of these details may be provided in putting the invention into practice.

I claim:

1. A device for retrieving items, comprising:

an elongated shank having a first end and a second end;

a disc having a central aperture and mounted on the shank for linear reciprocable movement between the first end and the second end;

a plurality of arms secured to the second end of the shank and radially disposed circumjacent the longitudinal axis of the shank;

each arm having a curvilinear finger for selectively gripping and releasing an item;

trigger means for spreading the arms to the open position so that the fingers are spaced from each other and for contracting the arms to the gripping position so that the fingers can be drawn together for gripping and retrieving the item; and the trigger means capable of reciprocable, slidable movement on the arms adjacent the second end of the shank whereby the fingers are located above the item in the open position and dropping the device on the item causes the disc to contact the trigger means, thereby forcing the trigger means to slide on the arms and forcing the fingers to contract toward the longitudinal axis so that the fingers can grip the item.

2. A device for retrieving an item by dropping the device onto the item, comprising:

an elongated shank having a first end and an opposite second end;

a plurality of arms secured to the second end of the shank and radially disposed about the longitudinal axis of the shank, the arms capable of selective movement from an open position to a gripping position so that the item can be gripped by the arms and released therefrom;

each arm having a curvilinear finger which can selectively engage and grip the item and selectively release the item as a result of the radial movement of the arms;

trigger means capable of slidable, reciprocable movement on the arms for spreading the arms so that the fingers can be selectively radially separated from each other to the open position circumjacent the shank longitudinal axis and for selectively drawing the arms closer to the longitudinal axis so that the fingers radially contract in order to engage and grip the item; and a weighted disc having a central aperture for mounting to the shank and capable of linear, reciprocable movement thereon so that the disc can selectively contact the trigger means for forcing the trigger means toward the fingers whereby the arms radially draw together causing the fingers to contract and thereby grip the item.

3. A manually-operable device for retrieving an item by spacing the device above the item and then dropping the device on the item, comprising:

an elongated shank having a first end and an opposite second end defining a longitudinal axis;

a plurality of flexible arms secured to the second end of the shank and which are radially disposed circumjacent the longitudinal axis of the shank for selective movement from an open disposition to a gripping disposition;

each arm terminating with a flexible, curvilinear finger and all the fingers radially spaced from each other when the arms are in the open disposition, the fingers capable of selectively contacting and gripping the item and selectively releasing the item concomitant with the movement of the arms;

trigger means mounted on the arms adjacent the second end of the shank for slidable reciprocable movement thereon so that the arms can be selectively radially spread to the open disposition and selectively drawn together toward the longitudinal axis so that the fingers can grip the item;

a disc having a central aperture for mounting on the shank and capable of linear, reciprocable movement thereon whereby dropping the device on the item causes the disc to move on the shank and contact the trigger means, forcing the trigger means to slide on the arms toward the fingers thereby causing the arms to radially draw together, whereupon the fingers move to the gripping position for engaging and retrieving the item.

4. The device of claim 3 wherein the trigger means includes a circular plate having a plurality of spaced-apart apertures so that one respective arm extends through one respective aperture thereby allowing the circular plate to travel in a linearly, reciprocable path on the arms.

5. The device of claim 4 wherein the circular plate is movably mounted on the arms in coaxial alignment with the longitudinal axis of the shank.

6. The device of claim 5 wherein the circular plate includes a projecting rod mounted to the circular plate and perpendicular to the longitudinal axis of the shank so that the projecting rod can be manually grasped for pulling the circular plate toward the second end of the shank in order to radially spread the arms to the open position.

7. A method of retrieving an item laying on the ground from a position located above the item and the ground which comprises the steps of:

(a) attaching a first end of a rope to an item retrieval device which includes:

an elongated shank having a first end and a second end;

a disc having a central aperture and mounted on the shank for linear reciprocable movement between the first end and the second end;

a plurality of arms secured to the second end of the shank and radially disposed circumjacent the longitudinal axis of the shank;

each arm having a curvilinear finger for selectively gripping and releasing an item;

trigger means for spreading the arms to the open position so that the fingers are spaced from each other and for contracting the arms to the gripping position so that the fingers can be drawn together for gripping and retrieving the item; and the trigger means capable of reciprocable, slidable movement on the arms adjacent the second end of the shank whereby the fingers are located above the item in the open position and dropping the device on the item causes the disc to contact the trigger means, thereby forcing the trigger means to slide on the arms and forcing the fingers to contract toward the longitudinal axis so that the fingers can grip the item.

(b) locking the item retrieval device in the open position by pulling the trigger means backward for spreading the arms;

(c) positioning the item retrieval device above the item and in generally vertical alignment therewith;

(d) lowering the first end of the rope and the item retrieval device to a position above the item whereupon the item retrieval device is momentarily held at that position;

(e) releasing the rope so that the item retrieval device falls through the remaining distance and contacts the item and the ground whereby the downward movement of the disc unlocks the trigger means so that the movement of the trigger means on the arms closes the arms on the item, resulting in the arms gripping the item;

(f) drawing the rope upward to the position above the ground with the item securely held by the arms; and (g) resetting the item retrieval device by pulling on the trigger means which spreads the arms to the open position, thereby allowing retrieval of the item.

* * * * *